Patented Mar. 25, 1947

2,417,924

UNITED STATES PATENT OFFICE 2,417,924

DESICCANT PAPER

Wright W. Gary, Los Angeles, Calif., assignor to Filtrol Corporation, Los Angeles, Calif., a corporation of Delaware No Drawing. Application September 14, 1943, Serial No. 502,365

6 Claims. (Cl. 117—152)

This invention relates to papers having high adsorption capacity; for example, it relates to papers having a high capacity for adsorbing moisture from air. Such paper is useful as wrapping paper to protect commodities from the harmful action of moist air. It is also useful as a blotting paper and a dehydration and dehumidification medium. Such paper permits of the exposure of a large area of water-adsorbent surface in proportion to the weight of the adsorbent, and thus is useful for all purposes in which the dehumidification of air is desired. Such paper will also show a similarly high adsorption capacity for other vapors and gases and has a general utility for such purposes.

It is an object of my invention to incorporate a desiccant material into paper.

The adsorbent which may be employed may be a material, such as silica gel, carbon black, Activated Alumina, bauxite, which show a high adsorption capacity particularly for water vapor, and sub-bentonite clays, both nautral and acid-treated. I prefer to employ a natural sub-bentonite clay such as may be activated by acid and thus converted into montmorillonite clay of high decolorizing and cracking activity for petroleum oil.

The desiccant employed should be one having a high capacity for adsorption of water at even low relative humidities. When employing clays, whether natural or acid-treated, it is preferred that the clay be dried to about 5% to 8% moisture content. Acid-treated clays are usually finished to a moisture content of 18% to 20%. Such clays show substantially no water adsorptive properties at relative humidities of 40% or lower relative humidity and will, instead, lose water, i. e., dry out. It is desirable to employ sub-bentonite clays of much lower moisture content to obtain the necessary desiccation. This reduces materially their capacity for adsorbing water vapor. It is preferred to dry the clays to from 5% to 8%, whereby their capacity for adsorption of water vapor is near maximum.

A characteristic sub-bentonite clay useful in carrying out my invention is given below. This clay is a typical sub-bentonite from Arizona, such as has been employed commercially in production of activated clay employed as a decolorizing and catalytic clay. A characteristic analysis of such clay is as follows:

Raw Cheto—V. F. basis

| | |
|---|---|
| Silica ($SiO_2$) | 67.3 |
| Titanium oxide ($TiO_2$) | 0.3 |
| Aluminum oxide ($Al_2O_3$) | 19.5 |
| Ferric oxide ($Fe_2O_3$) | 1.8 |
| Manganese oxide (MnO) | 0.80 |
| Magnesium oxide (MgO) | 6.9 |
| Calcium oxide (CaO) | 3.2 |

The following table illustrates a typical water-adsorptive capacity, at various humidities, of such a clay dried to a (V. M.) volatile matter content (moisture) of clay before exposure to humid air of 6.0%.

| Air Relative Humidity | Water Vapor Adsorption |
|---|---|
| Per cent | Per cent |
| 10 | 9.3 |
| 20 | 14.3 |
| 40 | 19.8 |
| 60 | 23.7 |
| 80 | 28.4 |
| 100 | 38.7 |

The method employed in this determination is that specified in the "Bureau of Ships ad Interim Specification," issued November 1, 1940, No. 51S32 (INT), and "Army-Navy Aeronautical Specification," AD–D–6, issued November 20, 1942.

In employing adsorbents as desiccants in my invention I prefer, in order to efficiently achieve the objects of my invention, to use such desiccants as will meet the following specification for desiccants, according to the method of the AN–D–6 specification previously referred to:

| Relative Humidity | Water Adsorption |
|---|---|
| Per cent | Per cent |
| 10 | About 5 to 15 |
| 20 | About 10 to 20 |
| 40 | About 15 to 30 |
| 60 | About 18 to 45 |
| 90 | About 25 to 70 |

In packaging of materials spoiled by humid air, it is desirable to have as a drying agent one having a material water-adsorption capacity at humidities of 40% or lower.

In one modification of my invention the paper may be coated with glue, plastic cement or other adhesive and the paper dusted with powdered desiccant. The layer of desiccant converts the paper into one having a high water-adsorption capacity. Such paper must be distinguished from blotting paper in that the paper adsorbs rather than absorbs water.

It is also important to so place the particles that they are not coated by the adhesive, but are merely held sufficiently to cause a firm bond, leaving most of the particles untouched by the adhesive. This insures maximum efficiency for the clay-paper combination as an adsorbent.

Instead of coating the paper as previously described, the adsorbent may be incorporated as a filler in the paper. The paper pulp is charged with the desired amount of comminuted adsorbent. Thus, we may employ finely ground silica gel, adsorbent charcoal, natural sub-bentonite clays, or acid-treated clays. Bentonite clays are distinguished from the sub-bentonite montmorillonite clays, which I prefer to employ, by their swelling and gelling characteristics. Such bentonites are also distinguished from the sub-bentonites in that the bentonite clays are not activatable by acid to give good oil-decolorizing clays or good oil-cracking catalysts. They are less desirable for purposes of my invention and I prefer not to employ them for this purpose since they have far inferior water-adsorptive characteristics in air of low humidity, for instance, at relative humidities less than 40 or 50%. For example, a bentonite clay when dried to 6% moisture content will show but a small fraction of the water-adsorptive efficiency of a sub-bentonite of the same moisture content if both are employed to adsorb water from air of 40% or lower humidity. Therefore, if it is desired that the paper maintain a low humidity of 40% or lower, it will be best obtained by employing as a desiccant a sub-bentonite rather than a bentonite. A characteristic Wyoming type bentonite when dried to about the same moisture content as the sub-bentonite whose water-adsorptive capacity is tabulated above shows the following adsorption under like conditions:

| Air Relative Humidity | Water Vapor Adsorption |
|---|---|
| Per cent | Per cent |
| 10 | .1 |
| 20 | .75 |
| 40 | 4.5 |
| 60 | 9.1 |
| 80 | 17.0 |
| 100 | 24.0 |

The adsorbent, for instance, the clay, is incorporated into the paper pulp and the pulp is formed in conventional manner. In fact, the clay may be used as other filler is used. The paper is dried on heated rolls and on calendering rolls. Additional drying of the paper by appropriate means may be employed. In forming on the hot rolls and on the calendering rolls, or, if desired, in the additional drying stage, the clay is dehydrated, usually to the preferred range of 5 to 8% V. M., at which point the paper itself will be at such moisture content or at a lower moisture content. The amount of drying is determined by the temperature of the drying felt, the temperature of the drying and calendering rolls, and the duration of the contact or the drying time and the characteristics of the further drying operation. Such a paper will have a high water-adsorptive capacity and will constitute a medium for exposing a large surface of adsorbent.

I prefer to employ in my invention a paper such as naturally has high water-retention properties. For example, index bristol board, kraft wrapping paper, and rope manila will hold more water than will newsprint at like relative humidities. Paper such as the bristol board, kraft wrapping paper, or rope manila, for example, when formed by conventional manner without the desiccant filler of my invention may hold from 3 to 6% of moisture when in equilibrium with air of 20% relative humidity; 5 to 8% when in equilibrium with air of 40% relative humidity and from 8 to 15% moisture when in equilibrium with air of 80% relative humidity. The water-adsorption capacities of such paper are much inferior to the dried adsorbents used as fillers in my invention, and the filled paper of my invention has a much higher adsorption capacity at all relative humidities and particularly at relative humidities of less than 40%. By the addition of my desiccant as a filler to the paper stock, the capacity to hold water when in contact with air at all relative humidities is increased.

The desiccant filler of my invention is comminuted and separated by screening or by elutriation to proper particle size which may range from 1 micron to 20 microns, or up to 300 to 500 mesh, more or less. It is incorporated in the same manner as is employed for other fillers. The filler may be used in amounts varying from 10 to 60% as, for instance 20 to 30%, depending on the mesh size of the filler and upon whether or not dispersing agents are used, as will be understood by those skilled in the art. Thus, when added to paper of high water retention or to paper of lower water retention, such as newsprint, the capacity to adsorb water from air of various humidities is largely increased.

While I have described my invention particularly in reference to the adsorption of moisture from air, the desiccant of my invention also has a high capacity for the adsorption of other vapors and gases and even liquids, and it may be employed for the purpose of adsorbing such gases and vapors from other gases and vapors with which they are mixed.

The paper of my invention will generally exhibit the high adsorption capacity of the adsorbent acting as a filler for said paper.

While I have described a particular embodiment of my invention for the purpose of illustration, it should be understood that various modifications and adaptations thereof may be made within the spirit of the invention as set forth in the appended claims.

I claim:

1. A paper having desiccant properties, comprising a sheet of paper containing a montmorillonite acid activatable sub-bentonite clay desiccant having a V. M. of about 5% to 8%.

2. A paper having desiccant properties, comprising a sheet of paper containing a montmorillonite acid activatable sub-bentonite clay desiccant having a V. M. of about 6%.

3. A paper as defined in claim 1 in which said desiccant is a natural sub-bentonite clay.

4. A paper as defined in claim 2 in which said desiccant is a natural sub-bentonite clay.

5. A paper as defined in claim 1 in which said desiccant is an acid activated sub-bentonite clay.

6. A paper as defined in claim 2 in which said desiccant is an acid activated sub-bentonite clay.

WRIGHT W. GARY.

REFERENCES CITED

The following references are of record in the file of this patent:

UNITED STATES PATENTS

| Number | Name | Date |
|---|---|---|
| 23,897 | Brown | May 10, 1859 |
| 296,463 | Rupp | Apr. 8, 1884 |
| 287,863 | Greenstreet | Aug. 7, 1906 |
| 1,784,509 | Baylis | Dec. 9, 1930 |
| 2,230,903 | Ostenberg | Feb. 4, 1941 |

OTHER REFERENCES

Bentonite, Technical Paper 438, Dept. of Commerce, 1928, pages 30, 45, and 47, 106—Bentonite.